2,980,660
POLYMERIZATION OF OLEFINS

Jack W. Ralls, Berkeley, Calif., assignor to California Research Corporation, San Francisco, Calif., a corporation of Delaware No Drawing. Filed Dec. 28, 1956, Ser. No. 631,025

3 Claims. (Cl. 260—93.5)

This invention relates to a process for polymerizing relatively low molecular weight olefins to produce solid crystalline olefin polymers and to a novel catalyst for such polymerizations.

It is an object of this invention to provide a process for polymerizing lower olefins characterized by high conversions and high yields of solid crystalline polymers.

It is a further object of the invention to provide a new polymerization catalyst capable of catalyzing the polymerization of relatively low molecular weight olefins to produce predominantly crystalline olefin polymers.

Pursuant to the invention, 1-olefins containing from 2 to 6 carbon atoms per molecule and having no chain branching closer to the olefin double bond than the 3 carbon atom are polymerized by contacting the olefinic material with a catalyst consisting essentially of a dispersion of $AlTi_2Cl_8$ and an alkali aluminum hydride in a nonpolar liquid. The process is carried out at a moderately elevated pressure and at a relatively low temperature usually below about 150° C.

The invention is more particularly described in the following examples and tabulated data summarizing results obtained pursuant to the process of the invention as operating conditions, catalyst composition, and olefin feeds are varied.

EXAMPLE 1

An illustrative preparation of the aluminum titanium chloride component of the catalyst may be carried out in the following manner: A 250 ml. stirred reactor was flushed with nitrogen to remove elemental oxygen. 100 ml. of mixed hexanes, 18.98 (0.1 mol) grams of titanium tetrachloride, and 1.35 (0.05 gram atom) grams of aluminum powder were then introduced into the reactor. The reactor was then closed and twice flushed with nitrogen at 200 p.s.i.g. The nitrogen was then vented from the reactor to reduce the internal pressure to approximately atmospheric. The reactor was then sealed and heated to 120° C. The contents were held at this temperature and stirred for 16 hours. The reactor was then cooled and flushed with nitrogen. The reactor was then transferred to a gloved box which was flushed with nitrogen to remove air and water vapor. The reactor was then opened and its contents were filtered to separate a hydrocarbon filtrate and a solid filter cake. The filter cake was washed with mixed hexanes, dried in a nitrogen atmosphere, and bottled while still in the nitrogen atmosphere. 19.19 grams of solid product were obtained. The solid was a reddish-purple amorphous material. There was no evidence that it contained more than traces of unreacted aluminum or any unreacted titanium tetrachloride. Analysis of the solid indicates it to have a composition corresponding to the empirical formula $AlTi_2Cl_8$. This solid alone has no capacity to catalyze polymerization of olefins but when it is dispersed in a nonpolar liquid together with an alkali aluminum hydride, the resultant dispersion is a highly effective polymerization catalyst.

EXAMPLE 2

Polymerization of propylene pursuant to the process of the invention is illustrated in the following exampe: A 360 milliliter rocking bomb was flushed with nitrogen to remove air and water vapor and charged with 100 ml. of mixed hexanes, 1.0 gram of $AlTi_2Cl_8$ and 0.5 gram of $LiAlH_4$ powder. The bomb was closed and flushed three times with nitrogen at 200 p.s.i.g. Nitrogen was bled from the bomb to atmospheric pressure and 37 grams of Phillips 99% propylene was introduced. The bomb was sealed and heated with shaking for one hour. During the last half of this period, the temperature was in the range 71° to 87° C. and the pressure was in the range 180 to 130 p.s.i.g. The shaking was interrupted and an additional 15 grams of propylene was introduced into the bomb, which was then heated and shaken for 2½ hours. The temperature and pressure during this period were 92°–97° C. and 130–215 p.s.i.g. The shaking was interrupted and an additional 15 grams of propylene were introduced into the bomb, which was again heated with shaking for a further period of one hour, the temperature and pressure being maintained in the same range as during the preceding 2½ hour period. The bomb was then cooled to room temperature, vented to permit escape of unreacted propylene, and flushed with nitrogen. The contents of the bomb were immersed in 400 cc. of isopropyl alcohol and the resulting mixture was heated on a steam plate for one hour, during which the volume was reduced to 100 ml. 300 ml. of water and 100 ml. of 12 N hydrochloric acid were then added to the beaker, which was heated on a steam plate for one hour. At the end of this period the contents of the beaker were filtered and the filter cake was washed with water. The filter cake was then ground to a powder in a Waring Blendor and resuspended in 300 ml. of water, 100 ml. of 12 N hydrochloric acid and 100 ml. of 2-propanol. The suspension was heated for one hour and filtered. The filter cake was washed with water, with dilute ammonia, and again with water. The filter cake was then extracted with diethyl ether to remove amorphous polymer. After the extraction 28 grams of dry, solid crystalline polymer remain. The ether washings were diluted with methanol and water. The amorphous polymer contained in the ether separated out as a gummy mass which was separated, dried, and weighed. The weight of the amorphous polymer was 11.62 grams.

EXAMPLE 3

A suspension of 2.0 grams of powdered $LiAlH_4$ in 200 ml. of dry ethyl ether was heated under reflux for six hours to get almost complete solution. The solution was transferred to a gloved box and all the air and water vapor displaced by dry nitrogen. The $LiAlH_4$ suspension was treated with 2.33 grams of powdered anhydrous aluminum chloride added in portions. The suspension was filtered after one hour to remove the LiCl and the undissolved residue from the $LiAlH_4$ solution. The colorless ether solution of $AlH_3$ was treated with 1.0 gram of finely divided sodium hydride. After a few minutes, the suspension became turbid and a light grey colored solid appeared as a coating on the surface of the sodium hydride. After three hours, the solid was collected by filtration and washed with ether. The weight of the solid was 1.12 grams. The yield of $NaAlH_4$ mixed with NaH was 0.24 gram. A separate experiment showed that a mixture of NaH and $AlTi_2Cl_8$ did not catalyze the polymerization of ethylene at 124° C. and 375 p.s.i.g.

A 360 milliliter rocking bomb was flushed with nitrogen and charged with 60 milliliters of mixed hexane, 1.0 gram of $AlTi_2Cl_8$, and 1.12 grams of mixed $NaAlH_4$–NaH prepared as described above. The bomb was capped and connected. The bomb and lines were flushed three times at 200 p.s.i.g. with nitrogen. After a pressure check and venting of the nitrogen, 72 grams of Phillips 99% propylene was added. The bomb was shaken and heated at 90°–118° C. and 320–535 p.s.i.g. for eighteen hours. The bomb was vented to release excess propylene, and the system flushed with nitrogen. The bomb was opened and its contents transferred into 200 ml. of isopropyl alcohol. After heating on a steam plate for two hours, water and hydrochloric acid were added. An oil phase separated out. After heating the mixture for three hours, the oil was separated in a separatory funnel. The oil was washed with water, dilute ammonia, and water. The product was a grey colored, turbid, rather mobile oil weighing 17.6 grams.

A series of runs in which the proportions of lithium aluminum hydride and $AlTi_2Cl_8$ were varied while reaction conditions were otherwise maintained substantially as shown in Example 2, are summarized in the following Table I. The yield figures in Table I and in certain of the other tables below report yields of both crystalline and amorphous polymer. Both types of polymer are solid, but the crystalline polymer is characterized by a sharp melting point, while the amorphous polymer has no sharp melting point but simply softens as the temperature is raised, much as glass does.

Table I
EFFECT OF VARYING PROPORTIONS OF $LiAlH_4$ AND $AlTi_2Cl_8$

| Run | $C_3H_6$ Charge, g. | $LiAlH_4$, g. | $AlTi_2Cl_8$, g. | Yield, g. Crystalline | Yield, g. Amorphous | Ratio |
|---|---|---|---|---|---|---|
| 1 | 67 | .5 | 1.0 | 24 | 11.6 | 2.1/1 |
| 2 | 76 | .2 | 1.0 | 39 | 18.2 | 2.1/1 |
| 3 | 57 | .1 | 1.0 | 33 | 15.9 | 2.1/1 |
| 4 | 70 | .05 | 1.0 | 10.5 | 19 | .6/1 |

Table II
EFFECT OF PRESSURE

[.5 g. $LiAlH_4$, 1.0 g. $AlTi_2Cl_8$ in mixed hexanes. Temperature 90°–104° C., $C_3H_6$ charge, 68–80 g.]

| Run | Average Pressure, p.s.i.g. | Yield, g. Crystalline | Yield, g. Amorphous | Ratio |
|---|---|---|---|---|
| 1 | 400 | 41.3 | 19.7 | 2.1/1 |
| 2 | 500 | 41.0 | 16.9 | 2.4/1 |
| 3 | 600 | 39.9 | 9.2 | 4.3/1 |
| 4 | 1000 | 11.5 | 6.6 | 1.7/1 |

The runs tabulated in the following Table III illustrate the effect of temperature on the process of the invention. Conditions in the runs correspond to those employed in the runs of Table II, except for the maximum temperature employed.

Table III
EFFECT OF TEMPERATURE

| Run | Maximum Temp., °C. | Product Melting Range, °C. | Polymer Film Character | Intrinsic Viscosity,[1] dl./g. |
|---|---|---|---|---|
| 1 | 120 | 156–163 | Quite brittle | |
| 2 | 140 | 158–161 | Very brittle | 4.85 |
| 3 | 107 | 159–162 | Somewhat brittle | 5.76 |
| 4 | 104 | 160–162 | Slightly brittle | 5.9 |
| 5 | 96 | 160–163 | Tough, flexible | [2] 2.85 |

[1] In tetralin at 120° C.
[2] In tetralin at 155° C.

From the tabulated data and similar runs, it is concluded that polymerization occurs readily at moderately elevated temperatures desirably below 150° C. and, preferably, in the range about 70° to 140° C.

In the following Table IV, data are presented from runs in which the lithium aluminum hydride and $AlTi_2Cl_8$ were dispersed in several nonpolar liquids.

Table IV
EFFECT OF MEDIUM

[0.5 g. $LiAlH_4$, 1.0 g. $AlTi_2Cl_8$, 380–490 p.s.i.g., 90–105° C.]

| Run No. | Propylene, g. | Solvent, 50 ml. | Yield, g. Crystalline | Yield, g. Amorphous | Ratio | Melting Range | Film |
|---|---|---|---|---|---|---|---|
| 1 | 57 | Mixed Hexanes | 33 | 15.9 | 2.1/1 | 161–3 | Tough. |
| 2 | 94 | Cyclohexane | 51.7 | 14.2 | 3.6/1 | 160–3 | Do. |
| 3 | 87 | Decalin | 42.2 | 8.5 | 5/1 | 162–4 | Do. |
| 4 | 112 | White Oil | 65 | 10.2 | 6.4/1 | 158–168 | Do. |

From the runs summarized in the above table and from observations in other runs, the conclusion is reached that the mol ratio of the hydride to the aluminum titanium chloride is desirably held in the range .5:1 to 10:1. Preferably, approximately equimolar quantities of the hydride and the aluminum titanium chloride are employed in preparing the dispersion which constitutes the catalyst.

The runs summarized in the following Table II illustrate the results obtained at several pressures using nitrogen as the gaseous diluent to maintain the desired pressures. The catalyst used in the tabulated runs was 0.5 gram of lithium aluminum hydride and 1.0 gram of $AlTi_2Cl_8$ dispersed in mixed hexanes. The temperature in the runs was 90° to 104° C. and the charge was 68 to 80 grams of propylene.

It is found that the employment of polar liquids as the material in which to disperse the lithium aluminum hydride and the $AlTi_2Cl_8$ causes considerable to complete loss of catalytic activity. In general, it is preferred to employ normally liquid hydrocarbons of the general character of those shown in the above table as the nonpolar liquid. However, other materials such as liquid propane, butane, pentane, benzene, toluene, xylene, trimethylbenzenes, and normally liquid olefins containing more than 6 carbon atoms per molecule may be employed.

In the following Table V, data are presented illustrating the character of the polymeric products obtained when certain olefinic hydrocarbons are polymerized pursuant to the process of the invention. Conditions employed in the runs shown in Table V correspond to the conditions employed in the runs set forth in Table IV.

Table V
CONDITIONS AS IN TABLE IV—MIXED HEXANES

| Run No. | Olefin | Weight, g. | Product, g. Crystalline | Product, g. Amorphous | Ratio | Melting Range, °C. | Film |
|---|---|---|---|---|---|---|---|
| 1 | $C_2H_4$ | 50 | 17 | | | 131-142 | Strong. |
| 2 | 1-butene | 77 | 35.2 | 32.1 | 1.1/1 | 101-2 | Soft, shows stretch orientation. |
| 3 | 1,3-butadiene | 76 | 50.3 orange, rubbery solid | | | | |
| 4 | 1-octene | 50 | None 1-octene all recovered | | | | |
| 5 | Styrene | 50 | 50 gummy solid | | | | |
| 6 | 3-methyl-1-butene | 74 | 11.4 | 1.0 | 11/1 | 227-232 | Will not mold at 240° C. |
| 7 | 1-hexene | 61 | 47 grey, rubbery solid | | | | |
| 8 | 2-methyl-1-butene | 85 | 10 liquid | | | | |

The tabulated runs and exploratory runs adapted to determine the range of effectiveness of the catalyst to polymerize olefins indicate that the catalyst is effective to produce solid polymers from 1-olefins containing from 2 to 6 carbon atoms per molecule and having no chain branching closer to an olefinic double bond than the 3 carbon atom. For example, no high polymer is produced from 2-methylbutene-1, while 3-methylbutene-1 yields a solid crystalline polymer, as indicated in the above Table V. Diolefins containing 4 to 6 carbon atoms per molecule, having at least one of the double bonds in a 1-position in the chain, and having no branching of chain closer to a double bond in the 1-position then the 3 carbon atom relative to that bond, yield crystalline polymers pursuant to the process of the invention.

In the following Table VI, the properties of the illustrative copolymers produced by the process of the invention are shown. Conditions in the runs correspond to conditions in the runs employed in Table IV.

I claim:
1. A polymerization catalyst consisting essentially of finely divided $AlTi_2Cl_8$ and a finely divided alkali metal aluminum hydride dispersed in a nonpolar liquid.

2. A process for polymerizing materials selected from the group consisting of 1-olefins containing 2 to 6 carbon atoms and having no chain branching closer to the olefinic double bond than the 3 carbon atom and styrene, which comprises contacting at least one of said selected materials with a catalyst consisting essentially of a dispersion of $AlTi_2Cl_8$ and an alkali metal aluminum hydride in a nonpolar liquid at a temperature below about 150° C.

3. The process as defined in claim 2, wherein the selected material is contacted with the catalyst at a temperature in the range 70° to 140° C. under a superatmospheric pressure in the range 100 to 1000 p.s.i.g.

Table VI
COPOLYMERS

| Run No. | Co-monomers | Proportion by Weight in Feed | Product, g. Crystalline | Product, g. Amorphous | Ratio | Melting Range, °C. | Film |
|---|---|---|---|---|---|---|---|
| 1 | Ethylene / Propylene | 1 / 4 | 42.3 | 13.8 | 3/1 | 150-170 | Heterogeneous, flexible, bending gives fibrous structure. |
| 2 | Ethylene / 1-butene | 1 / 5 | 31.8 | 34.0 | 0.9/1 | 101-130 | Soft, flexible, stretch orientation. |
| 3 | Styrene / Propylene | 5 / 1 | 10.5 | 4.7 | 2.2/1 | 159-160 | White, opaque, brittle. |
| 4 | Isoprene / Ethylene | 10 / 1 | 18.8 | 41.9 (oil) | | 130-152 | Moderately flexible film; fibrous structure. |
| 5 | Cracked Wax Olefins $C_5$-$C_{20}$ / Ethylene | 10 / 1 | 12.4 | | | 142-192 | Difficult to mold. |

Both the crystalline and amorphous polymers shown in the above Table VI are true copolymers. The variety of the copolymer properties illustrates the effectiveness of the present process and catalyst to induce copolymerization, opening the way to the deliberate tailoring of polymer product properties by proper selection of the stock fed to the process.

During numerous polymerization runs, the concentration of the $AlTi_2Cl_8$-alkali aluminum hydride catalyst in the non-polar liquid was varied over considerable range. Catalyst concentrations ranging from about 0.2% to 10% by weight in the non-polar liquids are effective.

Yields of the order of 50 parts by weight of crystalline polymer per part by weight of catalyst are readily obtained pursuant to the process of the invention.

References Cited in the file of this patent
UNITED STATES PATENTS

| | | |
|---|---|---|
| 2,721,189 | Anderson et al. | Oct. 18, 1955 |
| 2,839,518 | Brebner et al. | June 17, 1958 |
| 2,886,561 | Reynolds et al. | May 12, 1959 |
| 2,899,414 | Mertes | Aug. 11, 1959 |
| 2,905,645 | Anderson et al. | Sept. 22, 1959 |

FOREIGN PATENTS

| | | |
|---|---|---|
| 874,215 | Germany | Apr. 20, 1953 |
| 538,782 | Belgium | Dec. 6, 1955 |

OTHER REFERENCES

Raff et al.: Polyethylene, pages 72, 81, Interscience (1956).

Ruff et al: Zietschrift für anorg. chem., 128 (February 23, 1923), pages 81-95.